United States Patent [19]
Glomb et al.

[11] Patent Number: 5,009,136
[45] Date of Patent: Apr. 23, 1991

[54] TURNING MACHINE

[75] Inventors: Reiner Glomb, Velbert; Peter Maresch; Ralf Wagner, both of Solingen, all of Fed. Rep. of Germany

[73] Assignee: Th. Kieserling & Albrecht GmbH & Co., Werkzeugmaschinenfabrik, Solingen, Fed. Rep. of Germany

[21] Appl. No.: 447,742

[22] Filed: Dec. 8, 1989

[30] Foreign Application Priority Data

Dec. 22, 1988 [DE] Fed. Rep. of Germany ....... 3843257

[51] Int. Cl.$^5$ ................................................ B23B 5/12
[52] U.S. Cl. ..................................... 82/127; 409/167; 82/130; 82/131
[58] Field of Search ................... 82/38, 130, 131, 157, 82/124, 127, 162, 163, 164, 166, 167; 409/167; 51/238 S

[56] References Cited

U.S. PATENT DOCUMENTS

| | | |
|---|---|---|
| 2,601,716 | 7/1952 | Laningham ............................ 82/157 |
| 4,480,700 | 11/1984 | Krieger et al. ........................ 82/131 |
| 4,634,323 | 1/1987 | Wagner et al. ....................... 51/238 S |

FOREIGN PATENT DOCUMENTS 3346613 12/1983 Fed. Rep. of Germany .

*Primary Examiner*—Frederick R. Schmidt
*Assistant Examiner*—S. Keating Johns
*Attorney, Agent, or Firm*—Klein & Vibber

[57] ABSTRACT

A centerless turning machine for rods. The machine includes a cutter-head mounted at the front end of a rotating hollow shaft, and further includes a plurality of advancing rollers of an infeed device operatively mounted at the inlet end of the turning machine. The turning machine further includes a front guide mechanism and a rear guide mechanism, respectively mounted on opposite sides of the cutter head, and also includes a clamping carriage which is mounted on the outlet side of the turning machine. The rear guide mechanism takes the form of a tubular support which is provided with a flange mounted in the machine housing and which extends into the rotating hollow shaft. The rear guide mechanism has, at its free end, which protrudes into the hollow shaft, three individually spring biased guide elements for the rod. The springs for each individual guide element form a first resilient abutment for each guide element. The movements of the three guide elements are synchronized by a rotatable ring. The rotational position of the ring is prestressed against the housing. Upon a closing movement of the adjustmeent ring, the individual springs are compressed and finally each guide element abuts against a second rigid abutment.

3 Claims, 4 Drawing Sheets

TURNING MACHINE

BACKGROUND OF THE INVENTION

The invention relates to a turning machine of the type which converts round bars of hot rolled steel to so called bright steel by means of turning. This rod shaped round material is turned at its cylindrically shaped periphery by means of a rotating cutter-head. The rod itself is secured against undesired rotation and is guided axially through the central bore of the cutter-head of the turning machine. The rotating cutter-head supports three or more inwardly directed cutters which cut the surface of the rod along a helically shaped path. Such turning machines are conventionally used with wires, rods and pipes. The state of the art turning machines show advancing means including an infeed device with advancing rollers which are disposed on the inlet side of the cutter-head. Such an infeed device generally consists of two pairs of advancing rollers. The known bar turners of this type further comprise withdrawal means, e.g. a clamping carriage which is mounted on the outlet side of the cutter-head. The clamping carriage secures the rod against rotation and advances it, when the rear end of the rod is being turned.

Modern bar-turning-machines can be controlled as to their speed of advance, the speed of the cutter-head and the turned diameter of the bars during the operation of the machine.

The basic construction of the turning machine of this invention jointly with an infeed-device is disclosed in German Published application No. DE-A1 33 46 613. In this known arrangement the rod is guided by a so called "rear guide" at the outlet side, downstream of the cutter-head, within the hollow shaft. A guide arrangement for rods in turning machines of the aforedescribed type is described in German Published application DE-A1 32 40 146 and the corresponding U.S. Pat. No. 4,634,323. The construction and rigid connection between the tensioning arm, guide element and pivot shaft is illustrated in FIG. 2 of German Published Application No. DE-A1 33 46 613. The rear guide is mounted on the machine frame and extends into the rotating hollow shaft up to the region of the cutter-head. This known rear guide mechanism has individual spring biased guide elements, which abut against the work piece and has a central adjustment mechanism for all guide elements. The central adjustment mechanism is also spring biased. A drawback of such a turning machine having a rear guide mechanism is that the centering effect for guiding the turned rods is insufficient for maintaining the rod at the machine center. It is an object of the present invention to provide a turning machine having a rear guide mechanism in which the centering effect and the individual spring biased support effect are combinable in any predetermined fashion in accordance with the requirements of individual operational conditions.

This object of the invention is achieved by providing a turning machine with two stops for each one of the individual guide elements in a guide mechanism in the proximity of the cutter head, one of which stops is rigid and the other one is resilient. The rigid stops delimit the deflection of the resilient stops for the individual guide elements. "Rigid" refers to the individual movement of the guide elements relative to the central adjusting mechanism.

Preferably the forces of the spring means for the individual guide elements are adjusted in such a way that the sum of their forces is inferior to that of the central adjustment means.

A further embodiment of the invention includes the possibility of preselecting the individual spring rates or forces of the guide elements. A tighter individual spring support can be adjusted as well as of course a tighter central spring support.

In a preferred embodiment of the invention the guide elements are adjusted in such a way that their resilient stops do not define their position in normal operation. The springs for biasing the individual guide elements are deflected so that the individual guide elements, i.e. their tensioning arms abut against the rigid stops. Initially only the spring biased central adjustment mechanism by means of which all of the guide elements are synchronically and centrally opened, respectively closed, is effective. This serves the purpose of absorbing the tolerances of the diameter of the turned rod and a reliable contact of all guide elements with the rod and a concentric position with the machine center.

The particular advantages of the construction of the invention become obvious when a stiff and slightly curved rod which cannot be forced by means of the guide mechanism exactly into the center of the machine, is nevertheless sufficiently guided by the inventive arrangement. In such a case the curved rod presses the guide element, hindering it from taking an operative position so strongly, that the central adjustment mechanism of the guide elements opens the caliber of the arrangement. Nevertheless, the turned bar in the range of the rear guiding system cannot oscillate within the enlarged caliber. This is prevented by the springs of the remaining guide elements which cause these guide elements to follow the rod, when it leaves the center of the bar turner. These remaining guide elements abut only against the peeled and curved rod by virtue of the force of their individual springs.

This solution combines the advantages of a prevailing centering effect and a complementary individual resilient support of the bar by a set of guide elements during the turning process.

In order to achieve an adjustment of the rear guide mechanism for individual operative requirements a further embodiment of the invention includes means to adjust the force of the springs of the individual guide elements as well as the force of the central spring support.

The inventive arrangement provides first of all a very strong centering effect with the spring means for the individual guide elements being supressed. For this purpose the turning machine is adjusted and operated so that the individual spring supports will, mainly in the rare instance, when a very stiff and curved rod must be turned, complimentarily and auxiliarily support the deflected central spring support. In normal operation the individual guide elements are backed up only by the rigid stops.

The aforedescribed features for the rear guide mechanism may be transferred to a forward guide mechanism as well which is mounted between the infeed mechanism and the cutter-head.

BRIEF DESCRIPTION OF THE DRAWING

With these and other objects in view which will become apparent from the following detailed description, the present invention, which is shown by example only, will be clearly understood in connection with the accompanying drawing, in which.

DETAILED DESCRIPTION

Figure 1:
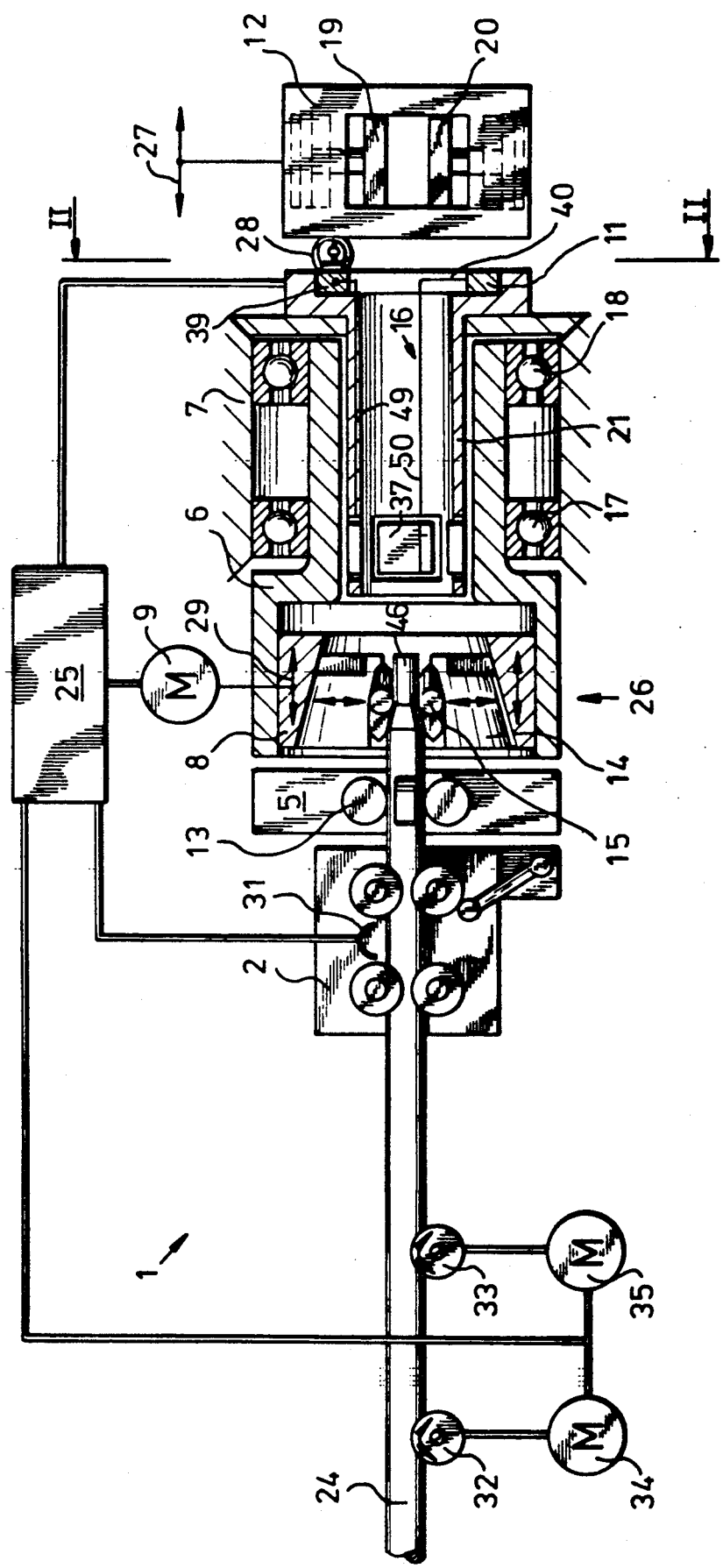
FIG. 1 is a schematic representation of a turning machine in side-elevational view which is partially in section.

FIG. 1 illustrates a rod 24, which is being turned in a centerless turning machine 1. The turning machine 1 consists of infeed means including an infeed device 2, a front guide mechanism 5 having two pairs of guide rollers 13, a cutter-head 26, a rear guide mechanism 3 and withdrawal means in the form of a clamping carriage 12. The cutter head 26 is arranged on the inlet side of a hollow shaft 6, which is rotatably mounted in the machine housing 7 on bearing supports 17, 18. The cutter-head 26 and hollow shaft 6 rotate during the operation of the machine. The cutter-head 26 supports a plurality of cutting inserts 15, which turn along a helical path a peripheral layer off the rod 24.

During the turning operation the rod 24 is centered by the front guide mechanism 5 and the rear guide mechanism 3 relative to the axis of rotation of the cutter-head 26 and the hollow shaft 6. The oscillations of the rod 24 originating from the metal cutting process are dampened by the two guiding mechanisms 3 and 5.

The rod 24 is separated from a bundle of rods in a nonillustrated manner and is then placed on the feed rollers 32, 33, which are driven by motors 34, 35 and which feed the rod to infeed means including an infeed device 2. The infeed device 2 advances the rod through the turning machine and takes over the torque from the cutting process.

The rod 24 is advanced through the turning machine without considerable rotation on its longitudinal axis. The operation of the entire machine is controlled by a CNC control arrangement 25, which is connected to the motors 34, 35 for the feed rollers 32, 33, is connected to the infeed device 2, to the forward guide mechanism 5, to the step motor 9 for the holder 14 of cutting inserts 15, it is further connected to the rear guide mechanism 3 and to the clamping carriage 12. An approach switch 31 controls the function of the clamping carriage. The infeed device 2, the forward guide mechanism 5, the cutter-head 26 and the rear guide mechanism 3, as well as the clamping jaws 19, 20 are adjusted by the CNC control unit 25 according to the raw diameter, respectively according to the finished diameter of the rod 24.

The adjustment of the cutting inserts 15 in the radial direction is carried out by means of the step motor 9, which axially reciprocally moves a conical sleeve 8. The holders for the cutting inserts are operatively mounted on the cutter-head 26 and are radially movably supported thereby. The movement in the axial direction (double arrow 29) of the conical sleeve 8 effects a change of the central opening in the cutter-head defined by the cutting inserts by moving the holders 14 with the cutting inserts 15 radially outwardly or inwardly.

Figure 2:
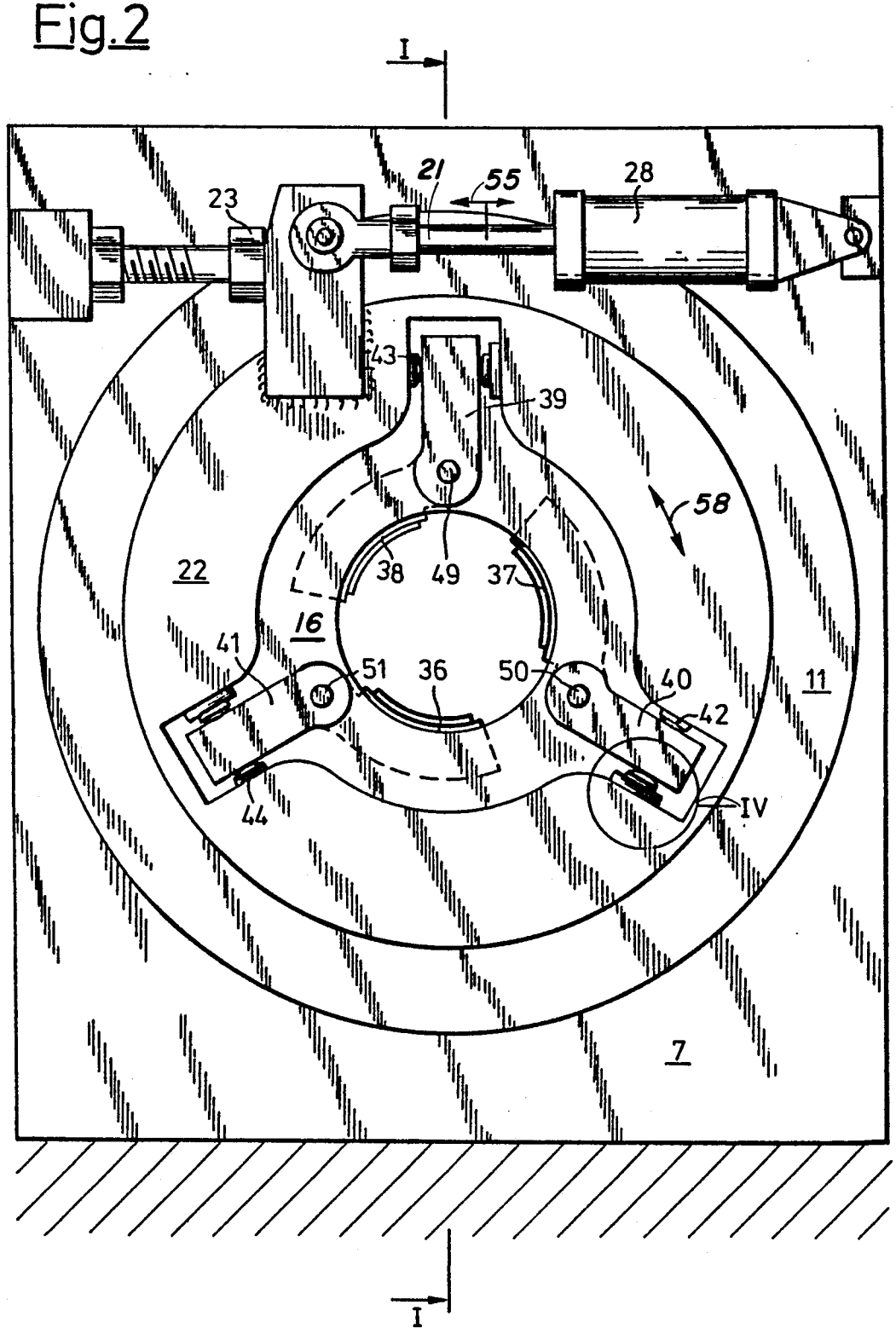
FIG. 2 is a front-elevational view along line II—II in FIG. 1 of a rear guide mechanism without a workpiece supported therein.

The rear guide mechanism 3 consists of a pipe shaped stud 16 which extends into the hollow shaft 6 and which is fastened by means of a flange 11 to the machine frame 7. The pipe shaped stud 16 extends deeply into the hollow shaft 6 up to the region of the cutter-head 26. At the inlet end of the pipe shaped stud 16, immediately adjacent to the outlet side of the cutter-head 26, there are arranged three guide elements 36, 37, 38 which are in direct contact with the rod 24 for centering the same and dampening its vibrations. The guide elements 36, 37, 38, are formed as flaps which are respectively secured on shafts 49, 50, 51 which are respectively pivotally mounted on the pipe shaped stud 16, and which extend through the wall of the pipe shaped stud 16 an axial direction up to the region of the flange 11 and is there actuated by an adjustment ring 22 via the tensioning arms 39, 40, 41, which are also respectively secured on shafts 49, 50, 51 which are respectively in this way rigidly connected to guide elements 36, 37, 38. The adjustment ring 22 is rotatably mounted in the flange 11 (see double arrow 58 in FIG. 2). All illustrated tensioning arms 39, 40, 41 abut with their free ends against either one of the stops which will be further described in conjunction with FIGS. 3-5. These tensioning arms 39, 40, 41 including their respective support pivot shafts 49, 50, 51 and the guide elements 36, 37, 38 are identically constructed. For example, the tensioning arm 40, shaft 50 and the guide element 37 are rigidly connected to each other. A rotational movement of the control ring 22 leads to a concentric and synchronous adjustment movement of the guide elements 36, 37, 38. The control ring 22, coacts with the cylinder 28 and stop 23 on the machine frame 7 to jointly form the central spring biased adjustment mechanism 48.

With a rotational movement of adjustment ring 22 all tensioning arms are simultaneously pivoted jointly with the guide elements 36, 37, 38 which are rigidly connected to them. The adjustment ring 22 is prestressed against the stop 23 (see FIG. 2) by means of a hydraulic cylinder 28 which can be reciprocated as shown by double arrow 55. If another diameter of the rod 24 is to be turned, the stop 23 is readjusted manually or by means of the control arrangement 25. Thereby the adjustment ring 22 is brought into a different angular position and the cross-section of the central opening in the rear guide mechanism for the rod 24 defined by the guide elements 36, 37, 38 is varied.

Figure 4:
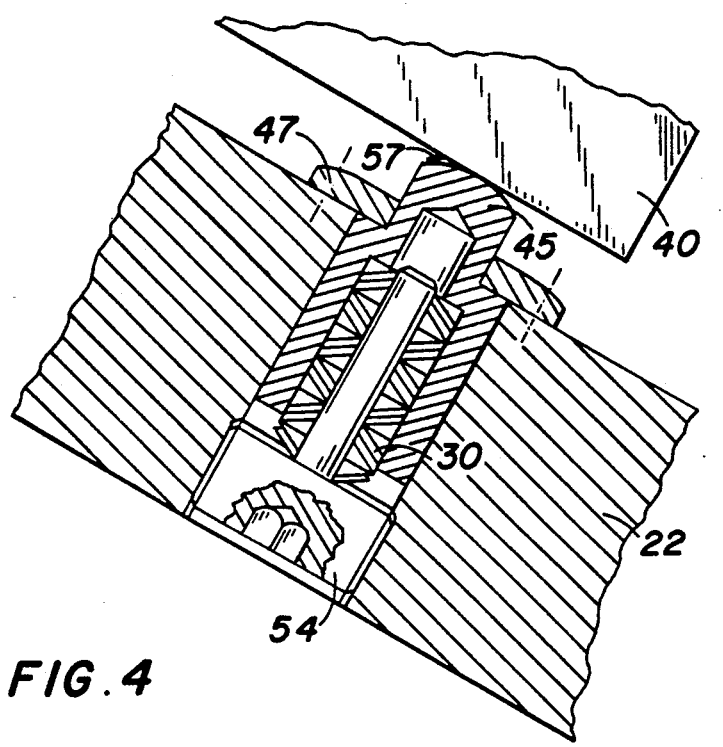
FIG. 4 is a cross-sectional view of a detail shown by means of a circle and indicated by the reference No. IV in FIG. 2.

The free ends of the tensioning arms 39, 40, 41 are resiliently supported in the adjustment ring 22 rotatably mounted in flange 11 of the rear guide mechanism 3 (see FIG. 4). The rear guide mechanism 3 is illustrated in full in FIG. 2 wherein the tensioning arms 39, 40, 41 are biased by the springs 30 against the stops 42, 43, 44.

In FIG. 4 the spring 30 pushes, via a slider 45, the tensioning arm 40 against the stop 42 in the control ring 22. Stop 42 is not operational during the turning process, it just serves to limit the inward movement of the tensioning arm 40. The stop surface of this slider 45 forms a first spring biased stop 57 for the tensioning arm 40 of guide element 37 which is rigidly attached thereto via pivot shaft 50. Thereby the free end of the tensioning arm 40 is maintained between the resilient stop 57 and the stop 42 if there is no bar in the rear guide system.

Each spring 30 is formed by one or more disk-spring-packages. By changing the layers and groups of the disk springs the individual spring rate (force) can be adjusted. The effective force of spring 30 may further be adjusted by means of threaded stud 54 which varies upon rotation the prestress of spring 30.

Figure 5:
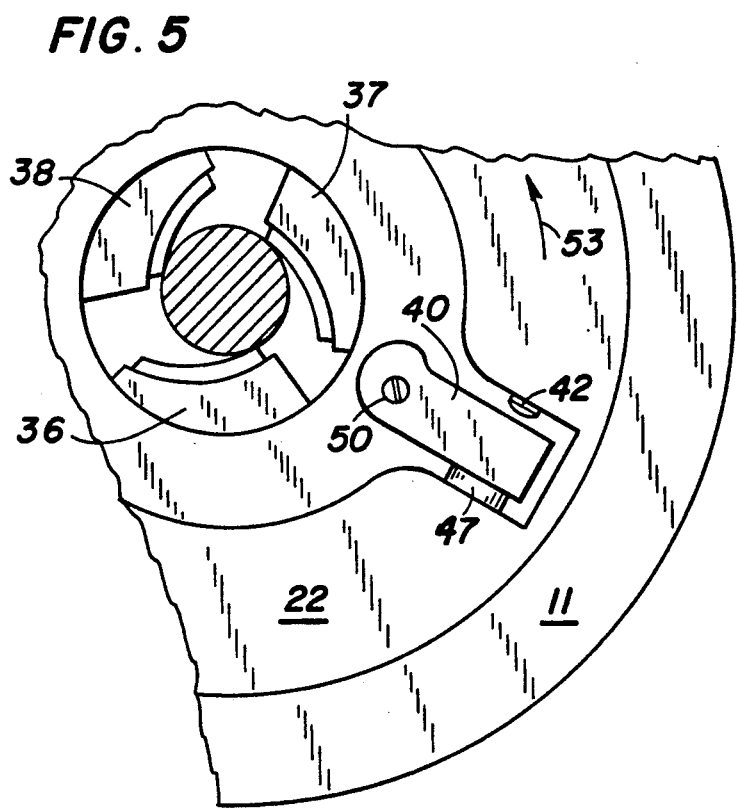
FIG. 5 is a partial cross-sectional view of a portion of FIG. 2 in which the rod which has been introduced has been centered.

Preparatory to the turning process the rear guide mechanism 3 is adjusted in such a way that the free passage between the guide elements 36–38 is too narrow, so that when the front end of the rod 24 is introduced in the rear guide mechanism 3 the guide elements 36, 37, 38 are pushed apart by the rod. For this purpose the glide elements 36–38 are provided with a lead conical introducing portion at their front end. By slightly pushing the guide elements 36, 37, 38 apart all tensioning arms 39, 40, 41 come to abut against the rigid stop rings 47 (see FIG. 4). As illustrated in FIG. 5, each tensioning arm 40 abuts against the rigid stop 47 when a centered rod is introduced. This is the normal position for the tensioning arms 39, 40, 41. Individual positioning of the spring biased guide elements 36, 37, 38 is suppressed. The tensioning arm 40 does not bear against the stop 42, but bears against the rigid stop ring 47.

As a rule the force of springs 30, is adjusted so that the force of the cylinder 28 is superior to the sum of forces established by individual springs 30 of all spring biased stops for the rear guide mechanism when tensioning arms 39, 40 abut against the rigid stops 47.

With extremely stiff rods 52 there may occur that these rods are not sufficiently centered, because, when considered over their length, they may be slightly curved. When the rod 52 is excentrically disposed in the rear guide mechanism 3 a very large force is exerted on the part of the guide element 36 on the rod 52, which tends to push the rod 52 towards the center, and two smaller forces are exerted by the guide elements 37, 38, which have exclusively the task, to prevent an oscillation of the rod in a transverse direction.

Figure 3:
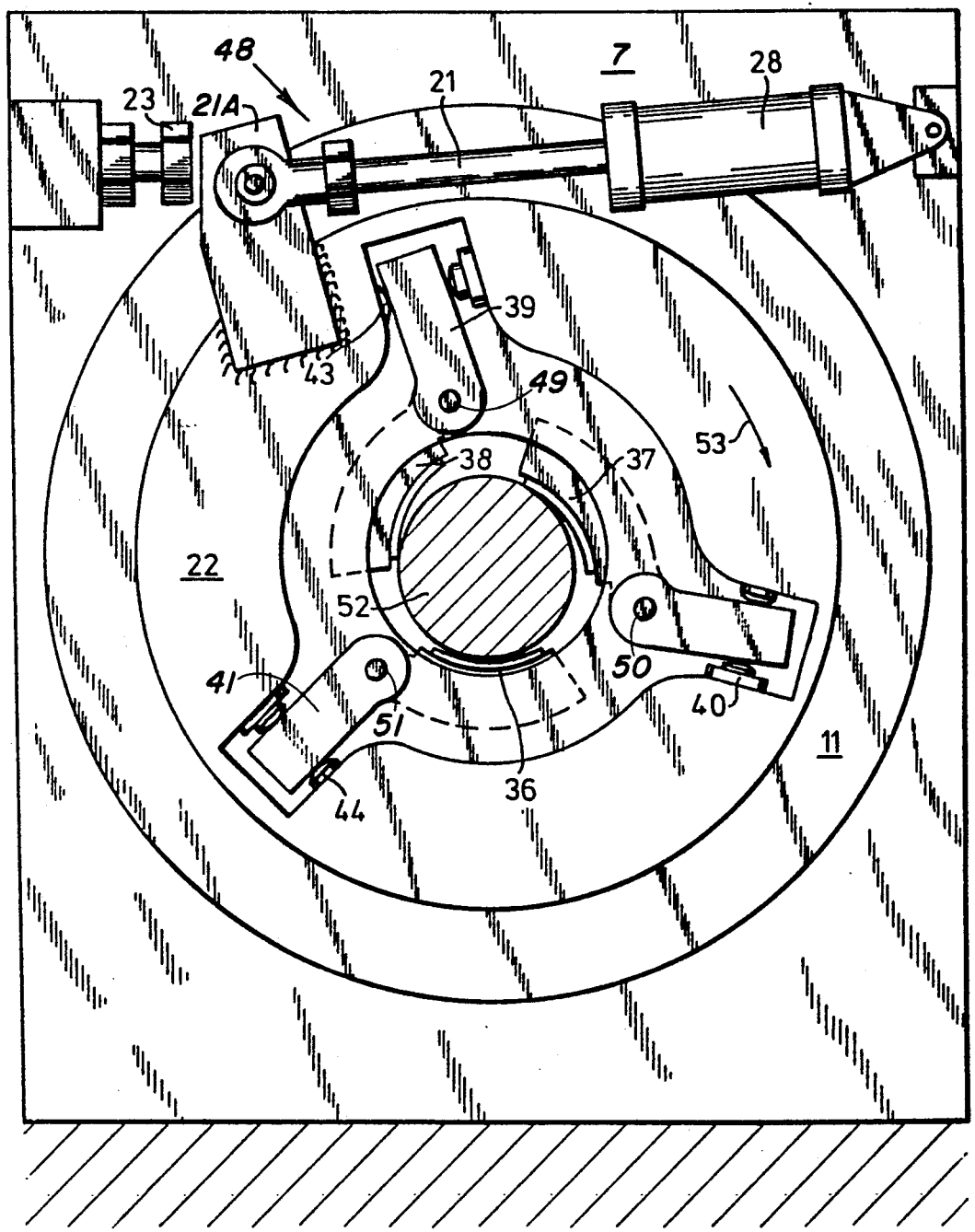
FIG. 3 is a front elevational view of the rear guide mechanism showing an excentrically disposed workpiece therein.

When the force of the rear guide mechanism 3 is insufficient for centering the rod 52 there opens first of all the central adjustment for all guide elements 36, 37, 38. The cylinder 28 can no longer push the control ring 22 against the stop 23 as shown in FIG. 3. Via the force of the rod 52 the control ring 22 is turned into the direction of arrow 53.

In the situation shown in FIG. 3 there is a combined spring biased support of the rod 52 in the rear guide mechanism 3 which is based on springs 30 for tensioning arms 39, 40, on the one hand, and cylinder 28, on the other hand. As a result, all guide elements 36 to 38 are continuously in contact with the bar. The use of disk springs 30 for the resilient support of the individual guide elements provides a certain dampening effect when oscillations of the rod 52 occur.

While a specific embodiment of the invention has been shown and described in detail to illustrate the application of the principles of the invention, it will be understood that the invention may be embodied otherwise without departing from such principles.

I claim:

1. Turning machine having a frame for turning rods, pipes, or the like which comprises the following features:
   (a) infeed means operatively mounted on the inlet side of the turning machine for infeeding a pre-cut rod into said inlet side;
   (b) rotating cutter-head means operatively mounted in said turning machine downstream from said infeed means for turning off a peripheral layer of said rod;
   (c) said rotating cutter-head means being mounted adjacent to the upstream end of a hollow shaft which is rotatably coaxially mounted in the frame of said machine;
   (d) a rear guide mechanism for approximately centering the rods, pipes or the like operatively coaxially mounted in said machine downstream of said cutter-head means;
   (e) the rear guide mechanism is operatively mounted on said machine frame and extends axially into said hollow shaft adjacent to said cutter-head means;
   (f) withdrawal means for withdrawing the finished turned workpiece from said turning machine mounted downstream from said rear guide mechanism;
   (g) said rear guide mechanism includes a plurality of individually spring biased guide elements operatively mounted therein which abut against said rod;
   (h) said rear guide mechanism includes central adjustment means operatively mounted in said machine for simultaneously adjusting all of said guide elements;
   (i) said central adjustment means includes spring biasing means whereby said spring biasing means selectively actuates said central adjustment means to simultaneously adjust all guide elements;
   (j) for each of said individual guide elements there are arranged two stops on said adjusting means;
   (k) a first stop of said two stops is rigidly mounted on said adjusting means, whereas the second stop of said two stops is spring biasedly mounted on said adjusting means whereby said rear guide mechanism may adjust to affect appropriate centering of the rod being turned;
   (l) the first rigid stop limits the spring deflection movement of each individual guide element which coacts with the second stop.

2. Turning machine according to claim 1, comprising the following additional feature:
   (m) the spring rate force of said spring biased central adjustment means is higher than the sum of the spring forces of said individual spring supports for said spring biased guide elements.

3. Turning machine according to claim 2, comprising the following feature:
   (n) the force of said individual spring supports as well as said central spring assembly means are adjustable.

* * * * *